United States Patent
Hay (10) Patent No.: US 9,638,020 B2
(45) Date of Patent: May 2, 2017

(54) SYSTEM AND METHOD FOR KICKING-OFF A ROTARY STEERABLE

(75) Inventor: Richard T. Hay, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 759 days.

(21) Appl. No.: 14/000,099

(22) PCT Filed: Feb. 17, 2011

(86) PCT No.: PCT/US2011/025238
§ 371 (c)(1),
(2), (4) Date: Sep. 24, 2013

(87) PCT Pub. No.: WO2012/112155
PCT Pub. Date: Aug. 23, 2012

(65) Prior Publication Data
US 2014/0008125 A1    Jan. 9, 2014

(51) Int. Cl.
*E21B 44/00* (2006.01)
*E21B 7/06* (2006.01)
*E21B 47/024* (2006.01)
*G05B 15/02* (2006.01)

(52) U.S. Cl.
CPC .............. *E21B 44/00* (2013.01); *E21B 7/067* (2013.01); *E21B 7/068* (2013.01); *E21B 47/024* (2013.01); *G05B 15/02* (2013.01)

(58) Field of Classification Search
CPC . E21B 7/06; E21B 7/067; E21B 44/00; E21B 47/02; E21B 47/024; G05B 15/02
See application file for complete search history.

(56) References Cited

U.S. PATENT DOCUMENTS

| | | | | |
|---|---|---|---|---|
| 6,467,557 | B1* | 10/2002 | Krueger | E21B 4/18 175/104 |
| 2004/0173381 | A1* | 9/2004 | Moore | E21B 4/18 175/76 |
| 2006/0260843 | A1* | 11/2006 | Cobern | E21B 47/024 175/45 |
| 2008/0294344 | A1* | 11/2008 | Sugiura | E21B 47/024 702/6 |
| 2012/0024606 | A1* | 2/2012 | Pirovolou | E21B 7/04 175/61 |
| 2012/0205154 | A1* | 8/2012 | Lozinsky | E21B 47/024 175/45 |

FOREIGN PATENT DOCUMENTS

| | | |
|---|---|---|
| EP | 1008717 A1 | 6/2000 |
| WO | 2011016803 A1 | 2/2011 |

OTHER PUBLICATIONS

International Search Report; Aug. 25, 2011.

* cited by examiner

*Primary Examiner* — Yong-Suk (Philip) Ro (57) ABSTRACT

A method and system for steering a rotary steerable tool in a borehole. A method includes determining an azimuthal angle between a reference direction and a reference point on a direction determination component of a tool string. The direction control component is remote from the rotary steerable tool. The azimuthal angle and a time at which the angle was determined are communicated to a rotary steerable tool direction control system. A steerable shaft of the rotary steerable tool is deflected based on the azimuthal angle and the time at which the angle was determined, thereby directing the rotary steerable tool in a predetermined direction.

31 Claims, 7 Drawing Sheets

SYSTEM AND METHOD FOR KICKING-OFF A ROTARY STEERABLE

BACKGROUND

Directional borehole operations, such as directional drilling, involve varying or controlling the direction of a downhole tool (e.g., a drill bit) in a wellbore to direct the tool towards a desired target destination. In directional drilling, for example, the direction of a drill bit is controlled to direct the bit, and the resultant wellbore, towards a desired target destination.

Various techniques have been used for adjusting the direction of a tool string in a borehole. Slide drilling employs a downhole motor and a bent housing to deflect the borehole. In slide drilling, the direction of the borehole is changed by using the downhole motor to rotate the bit while drill string rotation is halted and the bent housing is oriented to deflect the bit in the desired direction. Slide drilling systems are subject to various problems related to halting drill string rotation. For example, a non-rotating drill string is subject to sticking in the wellbore.

In contrast to slide drilling systems, rotary steerable systems allow the entire drill string to rotate while changing the direction of the borehole. By maintaining drill string rotation, rotary steerable systems overcome various deficiencies of slide drilling. A tool for controlling deflection in a rotary steerable system (i.e. a rotary steerable tool) generally includes a shaft that rotates with the drill string, and a housing surrounding the shaft that includes a device that applies a bending force to the shaft. By bending the shaft, the direction of the downhole end of the shaft is changed.

Directional systems require information to orient the downhole tool toward the desired destination. A slide drilling system must determine the orientation of the bent housing, while a rotary steerable system must determine the orientation of the housing surrounding the shaft. Consequently, the downhole tool generally includes one or more sensors that provide tool orientation information to a control system. The control system uses the orientation information to steer the tool. Some steerable tools include a magnetic compass usually of the electronic magnetometer variety to provide tool orientation information. Accelerometers can also be used to aid the compass in determining the horizontal component of the magnetic field to better calculate the North direction, especially in hole angles above 5° of inclination.

BRIEF DESCRIPTION OF THE DRAWINGS

In the following detailed description of exemplary embodiments of the invention, reference will be made to the accompanying drawings, in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. The embodiments disclosed should not be interpreted, or otherwise construed, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In order to properly steer the shaft of a rotary steerable tool, the orientation of the housing, and of the actuators within the housing, that apply bending force to the shaft must be known. The rotary steerable tool may employ one or more magnetometers (i.e., a magnetic compass) to determine the orientation of the housing relative to a reference direction, such as magnetic north. However, in the presence of a strong magnetic field or perturbations of the local Earth's magnetic field from magnetically shielding or magnetic field emitting components such as bearings, driveshafts, and housings, the magnetometer may be unable to accurately determine magnetic north, and consequently may be unable to determine the orientation of the housing and to accurately steer the shaft. Such a condition may exist, for example, if the rotary steerable tool itself generates a strong magnetic field.

Embodiments of the present disclosure allow a rotary steerable tool to use magnetic tool face for directing the tool when the tool emits or perturbs the local Earth magnetic field that interferes with the tool's ability to accurately measure the horizontal component of the Earth's magnetic field. Embodiments receive directional information from a component of the tool string configured to accurately determine a magnetic tool face. Using the received directional information, fixed rotational offsets between the rotary steerable tool and the component providing the directional information, and periodically measured rotational offset between the shaft and the housing of the rotary steerable tool, embodiments compute the orientation of the housing and accurately steer the shaft and tools coupled thereto.

Figure 1:
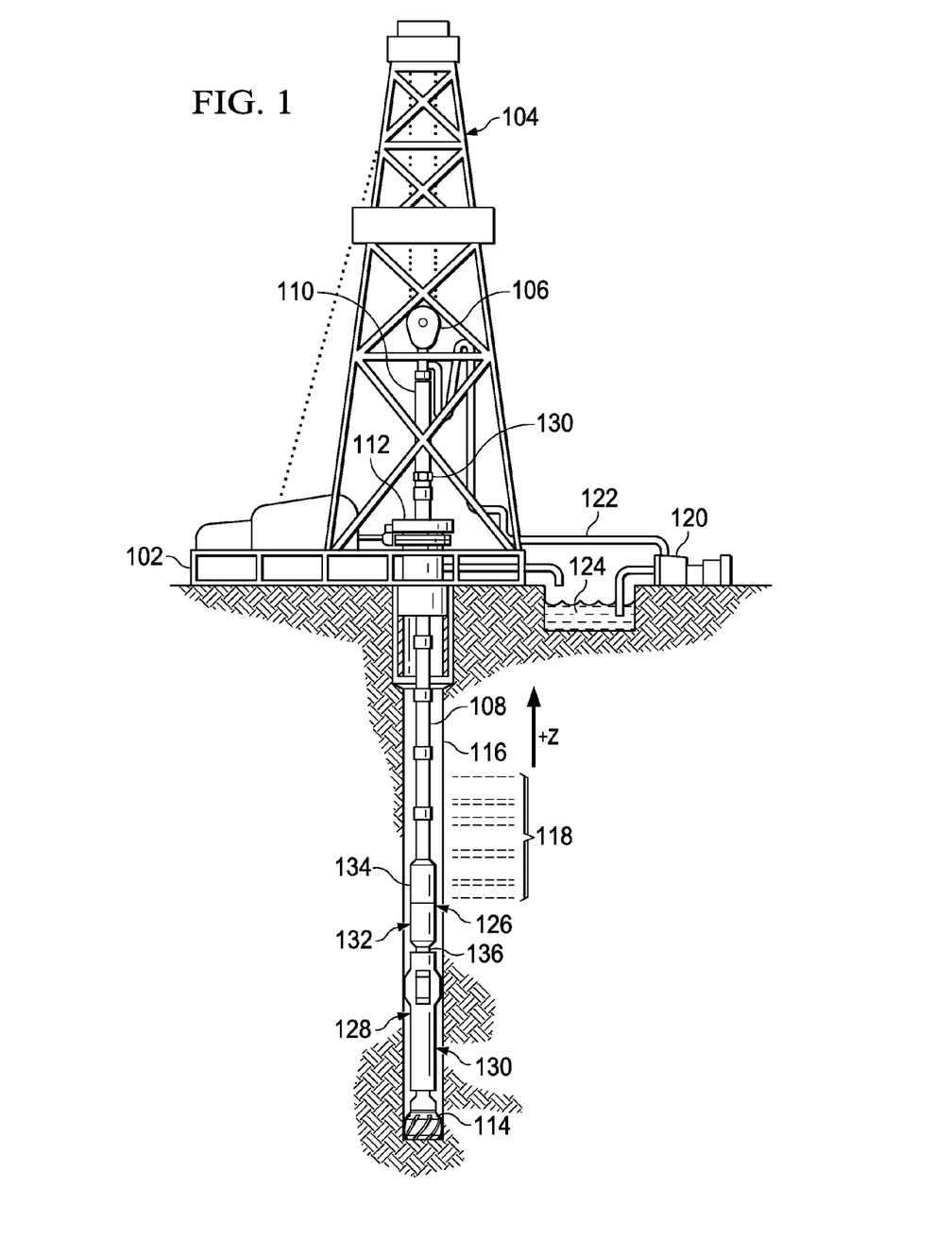
FIG. 1 shows a downhole tool string including a rotary steerable tool in accordance with various embodiments.

FIG. 1 shows a tool string 126 disposed in a wellbore 116. The tool string 126 including a rotary steerable tool 128 in accordance with various embodiments. A drilling platform 102 supports a derrick 104 having a traveling block 106 for raising and lowering a drill string 108. A kelly 110 supports the drill string 108 as it is lowered through a rotary table 112. In some embodiments, a topdrive is used in place of the kelly 110 and the rotary table 112. A drill bit 114 is driven by a downhole motor and/or rotation of the drill string 108. As bit 114 rotates, it creates a borehole 116 that passes through various formations 118. A pump 120 circulates drilling fluid through a feed pipe 122 and downhole through the interior of drill string 108, through orifices in drill bit 114, back to the surface via the annulus around drill string 108, and into a retention pit 124. The drilling fluid transports cuttings from the borehole into the pit 124 and aids in maintaining the borehole integrity.

The tool string 126 includes the rotary steerable tool 128 and a compass unit 132. The compass unit 132 is a direction determination component that may be a drill collar or sub or a component of sub (e.g., a MWD sub) disposed in the tool string 126 at a location that allows accurate determination of magnetic tool face (the angle between magnetic north and a reference location of the compass unit 132). Accordingly, the compass unit 132 includes a direction sensor (e.g., magnetometer) to determine an azimuth to magnetic north and a transceiver for communicating the azimuth to a direction control system that computes a magnetic tool face for the rotary steerable tool 128. In some embodiments, the direction sensor provides a system accuracy in the range of +/−1 degree or better.

The rotary steerable tool 128 includes a rotation resistant housing 130 disposed about a shaft 136 that transfers rotation through the tool 128. Both ends of the shaft 36 are coupled to components of the tool string 126. Actuators within the housing 130 deflect the shaft 136 to change the direction of the tool string 126. In some embodiments, the rotary steerable tool 128 includes the direction control system that computes a magnetic tool face based on the azimuth provided by the compass unit 132. In other embodiments, the direction control system is located elsewhere in the tool string 126 or at the surface and communicates to the rotary steering tool 128 the computed tool face or deflection control information that is used to control the actuators.

The tool string 124 may also include a logging-while-drilling ("LWD")/measurement-while-drilling ("MWD") tool 134 that collects measurements relating to various formation properties as well as the bit position and various other drilling conditions as the bit 114 extends the borehole 108 through the formations 118. A telemetry sub may be included to transfer tool measurements to and receive commands from a control/processing system located at the surface.

Figures 2A, 2B:
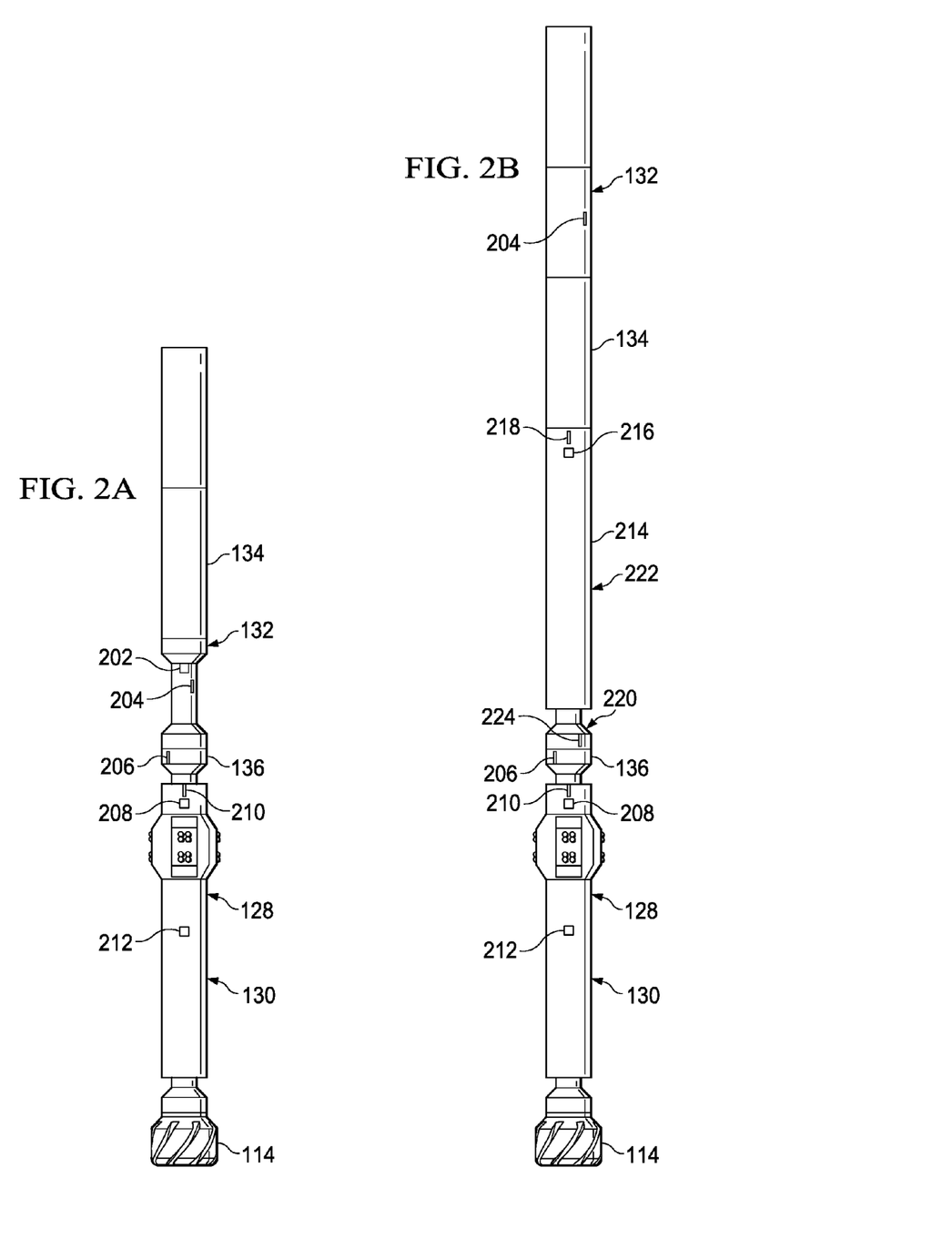
FIGS. 2A and 2B shows a rotary steerable tool and a compass unit in a tool string in accordance with various embodiments.

FIG. 2A shows the rotary steerable tool 128 and the compass unit 132 incorporated in a tool string in accordance with various embodiments. The compass unit 132 includes a direction sensor 202 (e.g., a magnetometer) configured to determine a reference direction, such as the direction of magnetic north. The compass unit 132 includes a reference point, reference location, or reference mark 204. The reference location 204 may be disposed at any position on the compass unit 132. In some embodiments, the reference location 204 identifies that location on the compass unit 132 relative to which a direction determination made (e.g., the location relative to which magnetic north is determined). The compass unit 132 is coupled to the shaft 136 of the rotary steerable tool 128.

The shaft 136 of the rotary steerable tool 128 includes a reference location 206. The angular distance between the reference location 206 of the shaft 136 and the reference location 204 of the compass unit 132 is measured when the tool string is assembled and provided to a steering controller 212 in the rotary steerable tool 128 or elsewhere in the steering system. The steering controller 212 is a direction control system that controls actuators within the rotary steerable tool 128 that determine the direction of the shaft 136. In some embodiments, the steering controller 212 or some portions thereof may be located outside the rotary steerable tool 128 (e.g., at the surface, in the compass unit, etc).

The angular distance measurement may be provided to the steering controller 212 by various means. For example, if the steering controller 212 is located at the surface, the angular distance measurement may be manually entered and/or transferred to the steering controller 212 via a surface communication network (e.g., a wired or wireless network). If the steering controller 212 is located in the rotary steerable tool 128 or elsewhere in the tool string, then a downhole communication system (e.g., mud pulse, wired pipe, wireline, etc.) may be used to transfer the angular distance measurement to the steering controller 212.

The rotary steerable tool 128 also includes a shaft position sensor 208. The shaft position sensor 208 determines the rotational position of the shaft 136 relative to a reference position 210 of the rotation resistant housing 130 of the rotary steerable tool 128. In some embodiments, the shaft position sensor 208 is aligned with the reference location 210 of the rotary steerable tool 128. In other embodiments, the shaft position sensor 208 is not aligned with the reference location 210, and a known fixed angular offset is applied to reference the shaft position sensor 208 to the reference location 210. Embodiments may include any of various types of rotary encoders known in the art to determine the position of the shaft 136 relative to the housing 130.

Figure 4A:
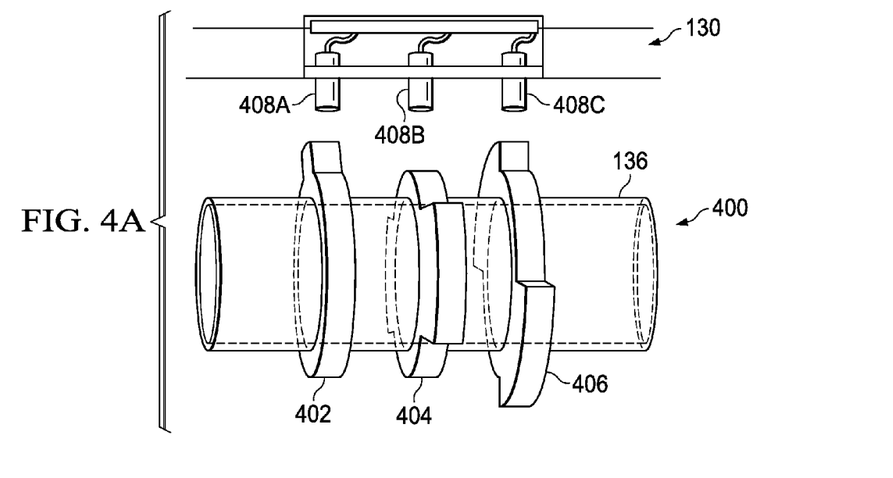
FIG. 4A shows position sensor suitable for use in a rotary steerable tool in accordance with various embodiments.
Figure 4B:
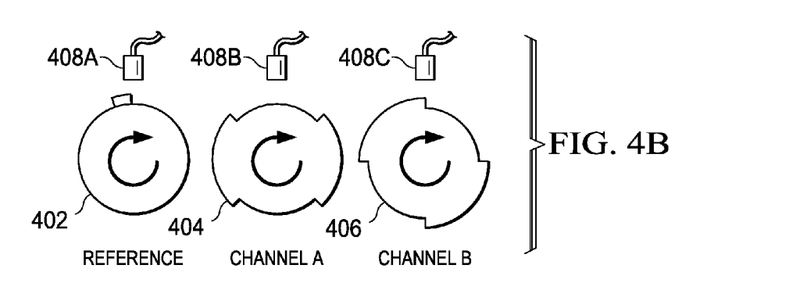
FIG. 4B shows a front view of each cam of the position sensor of FIG. 4A.
Figure 4C:
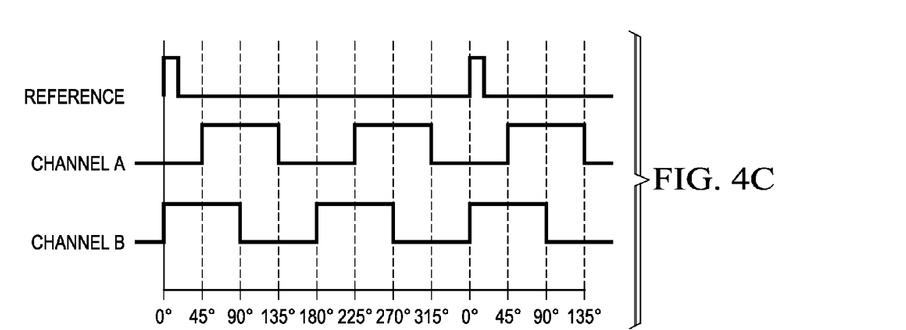
FIG. 4C shows a diagram of signals produced by the position sensor of FIG. 4A as the shaft rotates.

FIG. 4A shows an embodiment of a shaft position sensor 400 suitable for use with the rotary steerable tool 128 in accordance with various embodiments. The shaft position sensor 400 includes cams 402, 404, and 406 disposed on the shaft 136 and corresponding sensors 408A, 408B, and 408C disposed in the rotation resistant housing 130. The sensors 408A-408C are proximity sensors that may be optical magnetic, hall effect, inductive, acoustic or any other type of proximity sensor known in the art. FIG. 4B shows a front view of each cam 402-406 and the corresponding sensor 408A-408C. The cam 402 is a configured to indicate a reference position (e.g., zero degrees of shaft rotation with reference to the marks 206 and 210 of the shaft 136 and housing 128). The cams 404 and 406 may have the same lobe configuration with a 45° rotational offset. Thus, as the shaft 136 rotates the proximity sensors 408A-408C detect the cams and produce the output values shown in FIG. 4C. The shaft position sensor 400 provides 45 degrees of instant resolution and can detect rotation of the shaft 136 in either direction allowing for identification and exclusion of non-linear rotation speeds associated with slip-stick and backwards rotation.

Some embodiments of the shaft position sensor 400 may use magnets embedded in an arc about the shaft 136 or on a surface circumferentially extending from the shaft 136 rather than the cams 402-406. With such an arrangement, the sensors 408A-408C detect the embedded magnets and produce signals similar to those of FIG. 4C.

Figure 4D:
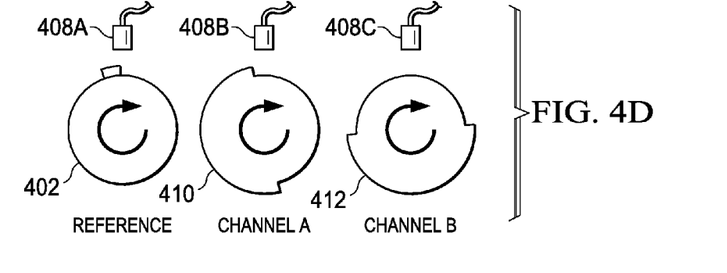
FIG. 4D shows a front view of an alternative set of cams suitable for use in a position sensor of a rotary steerable tool.
Figure 4E:
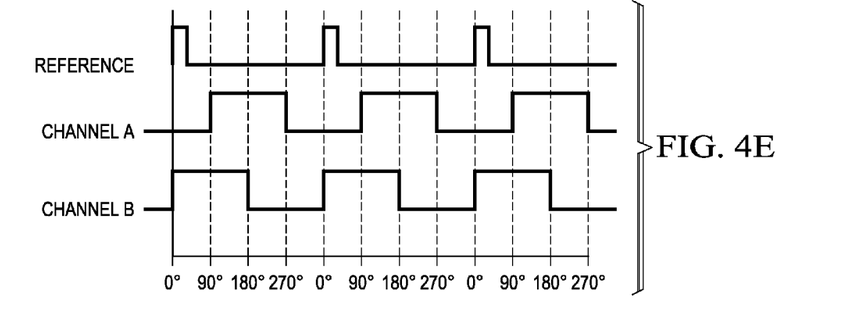
FIG. 4E show a diagram of signals produced using the cams of FIG. 4D.

FIG. 4D shows a front view of an alternative set of cams suitable for use in a position sensor of a rotary steerable tool. The cams 404 and 406 have the same lobe configuration with a 90° rotational offset. Consequently, the cams 404, 406 when used with the sensors 408A-408C provide 90 degrees of instant resolution, can detect shaft rotation in either direction, and can identify shaft position when the shaft is stationary or rotating. As the shaft 136 rotates the proximity sensors 408A-408C detect the cams 402, 410, 412, and produce the output values shown in FIG. 4E.

Various other shaft position sensor arrangements may be employed to detect the rotational position of the shaft 136. For example one or more lobes radially arranged about the shaft 136 may be detected as the shaft rotates by sensors associated with the housing 130 to determine the rotational position of the shaft 136 relative to the housing 130.

Returning now to FIG. 2, the steering controller 212 combines the directional information provided by the compass unit 132, the angular offset of the compass unit 132 and the shaft 136, and the rotational offset of the shaft 136 and the housing 130 to determine the orientation of the housing 130 relative to the reference direction detected by the compass unit 132 (e.g., the orientation of the housing relative to magnetic north).

FIG. 2B shows the rotary steerable tool 128 and the compass unit 132 incorporated in a tool string with a downhole motor 214 in accordance with various embodiments. The downhole motor 214 is disposed between the compass unit 132 and the rotary steerable tool 128 in the tool string. The downhole motor 214 includes a shaft 220, a housing 222, a shaft position sensor 216, and a reference location 218. Rotation of the shaft 220 is induced by the flow of drilling fluid through the downhole motor 214. The rotational position of the shaft 220 is determined by the shaft position sensor 216 as described above, with regard to the shaft position sensor 400 for example, and provided to the steering controller 212. The angular offset between the compass unit 132 and the downhole motor 214 (e.g., angular offset between the reference locations 204 and 216) is provided to the steering controller 212. Similarly, the angular offset between the shaft 220 and the shaft 136 (e.g., angular offset between the reference locations 224 and 206) is provided to the steering controller 212. The steering controller 212 combines the rotational position of the shaft 220, the rotational position of the shaft 136 as described above, and the angular offsets between the compass unit 132, the downhole motor 222, and the shafts 220, 136 to determine the orientation of the housing 130 of the rotary steering tool 128 relative to the reference direction detected by the compass unit 132.

Figure 3:
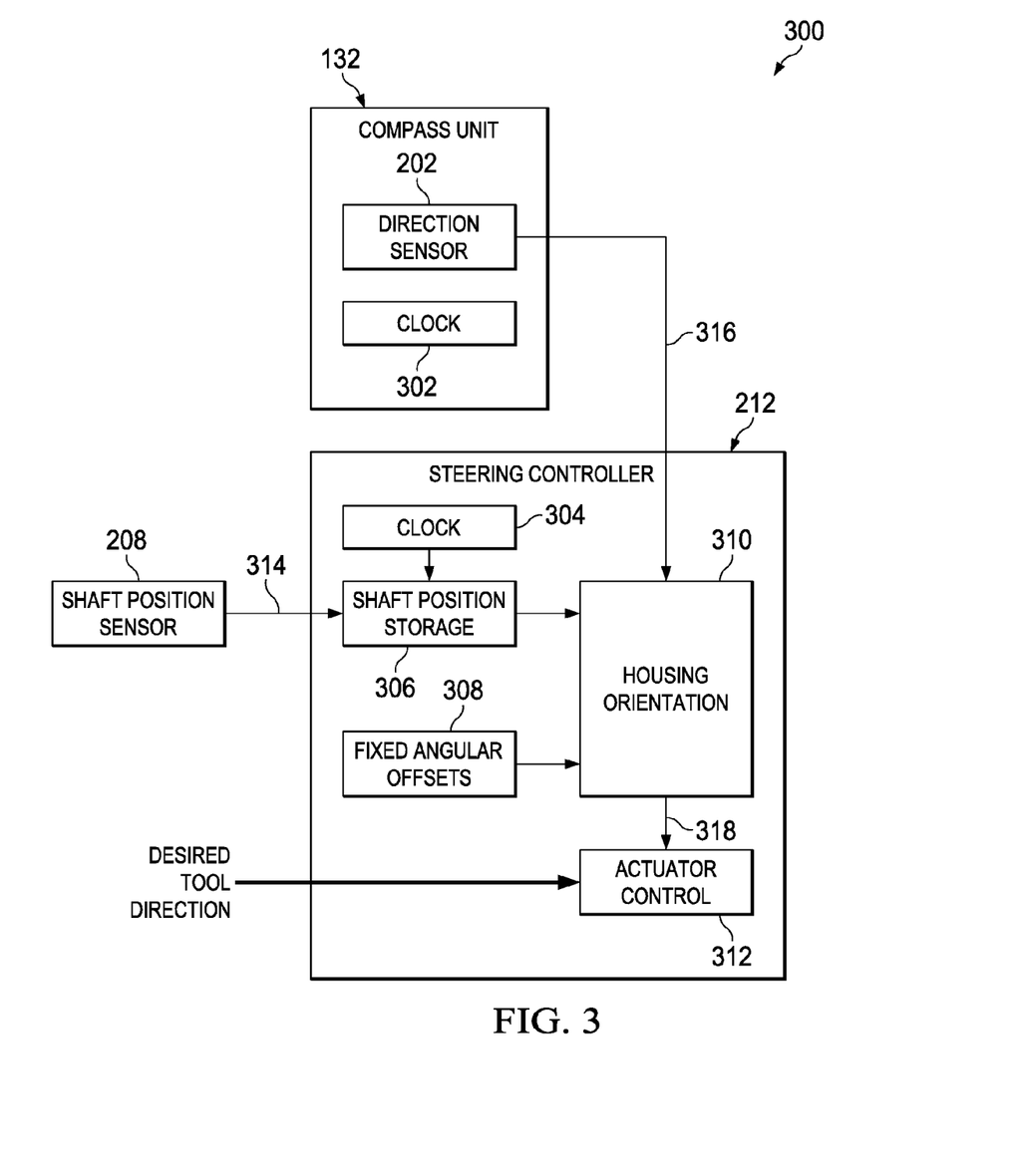
FIG. 3 shows a block diagram of system for steering a rotary steerable tool in accordance with various embodiments.

FIG. 3 shows a block a diagram of a system for steering a rotary steerable tool in accordance with various embodiments. The system includes the compass unit 132, the steering controller 212, and the shaft position sensor 208. The compass unit 132 includes a clock 302 and a direction sensor 202 (e.g., a magnetometer) that determines the orientation of the compass unit 132 relative to a reference direction. In some embodiments, the clock 302 may be a counter or timer.

The shaft position sensor 208 determines the rotational position of the shaft 136 relative to the rotation resistant housing 128 of the rotary steerable tool 128. Some embodiments of the shaft position sensor 208 may incorporate the shaft position sensor 400.

The steering controller 212 includes a clock 304, shaft position storage 306, storage of fixed angular offsets 308, housing orientation logic 310, and actuator control 312. The clock 304 is similar to and is synchronized with the clock 302 of the compass unit 132. Communication may be provided between the compass unit 132 and the steering controller 212 to facilitate clock synchronization. The steering controller 212 and/or portions thereof may be disposed in the rotary steerable tool 128, in a different downhole tool, or at the surface.

The steering controller 212 periodically (i.e., at a regular or irregular interval) receives determinations of shaft position 314 relative to the housing 128 from the shaft position sensor 208. For each received determination of shaft position 314, a time value is provided by the clock 304 to identify the time at which the determination of shaft position 314 was made. The time value and the determination of shaft 136 position are stored in the shaft position storage 306. The shaft position storage 306 may be implemented as a circular buffer and may include any of a variety of memory technologies, such as semiconductor static random access memory. The storage 306 should include enough storage capacity to store shaft position determinations acquired between the time the compass unit 132 makes a direction determination and the time the steering controller receives the direction determination from the compass unit 132. In some embodiments, the shaft position storage 306 also stores shaft position information received from shaft position sensor 216 of the downhole motor, or from another downhole tool that includes a shaft position sensor.

The storage for fixed angular offsets 308 contains the various angular offsets between reference locations of the tools in tool string. For example, in the embodiment of FIG. 2A, the storage for fixed angular offsets 308 stores the angular offset between the reference location 204 of the compass unit 132 and the reference location 206 of the shaft 136. In the embodiment of FIG. 2B, the storage for fixed angular offsets 308 stores the angular offset between the reference location 204 of the compass unit 132 and the reference location 218 of the downhole motor 214, and also stores the angular offset between the reference location 224 of the shaft 220 and the reference location 206 of the shaft 136. The angular offsets between tools may be determined when the tool string is assembled and stored in the storage for fixed angular offset 308 via communication with the steering controller 212 from a surface system.

The housing orientation logic 310 receives a direction determination 316 provided by the compass unit 132. The direction determination 316 includes a time value at which the direction determination was made, and an azimuth defining an angle between a reference direction (e.g., magnetic north) and a reference location (e.g., reference location 204) of the compass unit 132. Due to delays in communication between the compass unit 132 and the steering controller 212, the direction determination 316 is received by the housing orientation logic 310 some time after the determination 316 is made. As explained above, each determination of shaft position 314 is stored along with a corresponding time value in the shaft position storage 306. The housing orientation logic 212 searches the shaft position storage 306 to identify a time value (and associated shaft position determination) corresponding to the time value included in the direction determination 316. The housing orientation logic combines the angular information received from the compass unit 136, the shaft position sensor 208, and the fixed angular offset storage 308 to determine the orientation of the housing 130 relative to the reference direction identified by the compass unit 132.

In some embodiments, the housing orientation logic 310 may compute the orientation of the housing 130 by interpolating between two shaft position values acquired at time values surrounding the time of the compass unit direction determination 316. In some embodiments, the housing orientation logic 310 measures the rotation speed of the shaft 136 and establishes the orientation of the housing 128 based on measured rotation speed and a direction determination 314 retrieved from the shaft position storage 306.

The actuator control 312 receives a housing orientation value 318 from the housing orientation logic 310 and receives a desired tool direction from a surface control system or from storage in the steering controller 212, and causes actuators in the rotary steerable tool 128 to apply lateral or bending force to the shaft 136, thereby steering the 114 in the desired tool direction.

Various components of the steering controller 212 and the compass unit 132, including at least some portions of the direction sensor 202 and the housing orientation logic 310 can be implemented using a processor and software programming that causes the processor to perform the operations described herein. In particular, software programming can be used to cause a processor to determine an angular distance between the reference position 204 and a reference direction (e.g., magnetic north) and to determine the magnetic tool face of the housing 130. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming executable by a processor can be stored in a computer readable storage medium. A computer readable storage medium comprises volatile storage such as random access memory, non-volatile storage (e.g., a hard drive, an optical storage device (e.g., CD or DVD), FLASH storage, or combinations thereof.

Some embodiments can implement portions of the compass unit 132 and the steering controller 212 using dedicated circuitry (e.g., dedicated circuitry implemented in an integrated circuit). Some embodiments may use a combination of dedicated circuitry and software executed by a processor. Selection of a hardware or software/processor implementation of embodiments is a design choice based on a variety of factors, such as cost, time to implement, and the ability to incorporate changed or additional functionality in the future.

Figure 5:
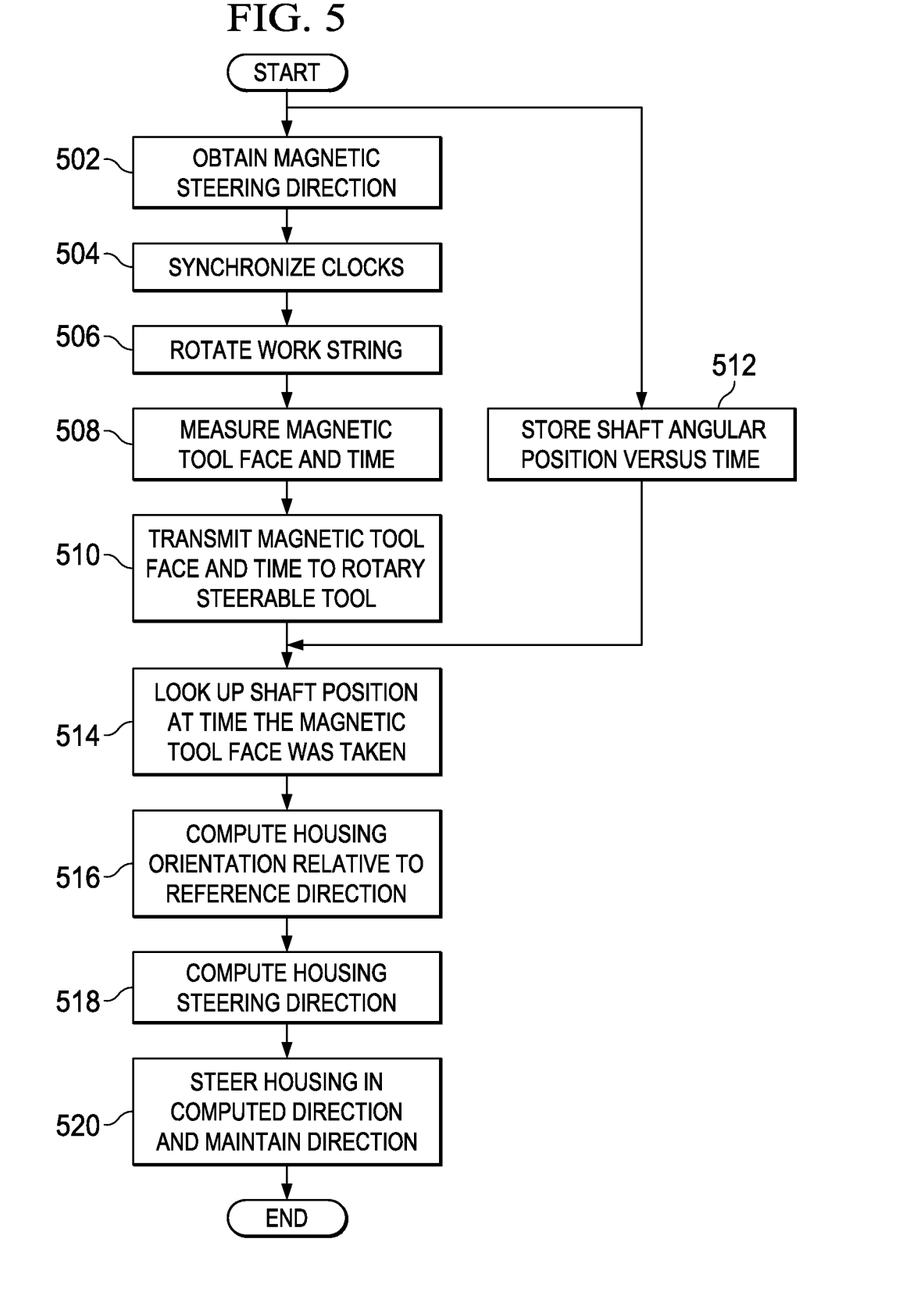
FIG. 5 shows a flow diagram for a method for steering a rotary steerable tool in accordance with various embodiments.

FIG. 5 shows a flow diagram for a method for steering a rotary steerable tool 128 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 5, as well as other operations described herein, can be implemented by the compass unit 136, the rotary steerable tool 128, and/or the steering controller 212 as instructions stored in a computer readable medium and executed by a processor (e.g., a processor in the steering controller 212, in the compass unit 132, etc).

In block 502, the direction of a downhole tool string is to be changed based on a magnetically determined reference direction, and the desired direction of the tool string relative the magnetically determined reference direction is established. Use of a magnetically determined reference direction may be predicated on unavailability or inaccuracy of other direction determination methods. A direction change may be initiated within a downhole tool based a deviation from a previously determined desired direction or based on direction information received from the surface. The desired tool string direction is provided to the steering controller 212. The desired direction can also be determined from a pre-planned well profile downloaded into the tool prior to the run or down loaded to the tool during the run. The system can then drill in a closed loop manner to the desired well profile by measuring depth down hole or having the depth intervals down linked to steering control system at various intervals over the course of the drilling run.

In block 504, the clock 302 in the compass unit 132 and the clock 304 in the steering controller 212 or associated with the shaft position storage 306 are synchronized. The clock synchronization allows for coordinated acquisition and/or identification of corresponding time sampled reference direction offset and shaft/housing position values. If twist or rotational compliant tools are disposed between the compass unit 132 and the rotary steering tool 128, then clocks in those tools may implement storage of time-stamped position values that require the clock to be synchronized to the clock in the compass unit 132.

In block 506, the tool string is rotated. The tool string may be coupled to a drill string or to any type of downhole work string requiring steering (e.g., for completions that need to enter a side track). The work string may be positioned off the bottom of the borehole to reduce torsional vibration and the rate of rotation may be substantially constant. If a downhole motor 214 is used to rotate the tool sting, the string may be held stationary at the surface while the downhole motor 214 rotates the rotary steerable tool 128. If a shaft position sensor 208 is used that allows determination of shaft position without rotation (e.g., the position sensor 400), then the tool string need not be rotated to determine the rotational position of the housing 130.

In block 508, the compass unit 132 measures the direction of its reference location relative to the reference direction (e.g., magnetic north). The measurement may be made using a magnetometer to detect magnetic north, however, embodiments may employ any reference direction (e.g., true north), and measurement device configured to detect the reference direction (e.g., a gyroscope).

In block 510, the compass unit 132 provides the direction measurement to the steering controller 212. The time at which the measurement was acquired is also provided to the steering controller. The time value is provided by the synchronized clock 302 of the compass unit 212.

In block 512, the shaft position sensor 208 makes a determination of shaft 136 rotational position relative to a reference point 210 of the rotation resistant housing 130. The rotational position of the shaft 136 and a time value at which the rotation position was determined are stored in the shaft position storage 306. The acquisition and storage of shaft rotational position information may be continuous or may encompass only an interval proximate to when the compass unit 132 makes a direction determination. Some embodiments store shaft rotational information based on a detected change in rotational position.

If the shaft 136 is rotating relative to the housing 130, then various techniques that can be employed to improve the accuracy of the determined position of the shaft. For example:

1. The position sensor can be sampled at a higher rate so that the magnets or lobes are more accurately detected.
2. A moving average can be applied over a predetermined number of rotations to provide a smoothed rotation speed estimate to better estimate shaft position versus time.
3. RPM values outside a predetermined range (e.g., ½ of a standard deviation of a predetermined RPM value) can be omitted from the RPM determination.

In block 514, the steering controller 212 accesses the shaft position storage 306 and retrieves therefrom shaft rotational position information corresponding the acquisition time of the received compass unit direction determination. Embodiments may apply interpolation to provide shaft position estimates. For example, if using the shaft position sensor 400, a shaft position value and time-stamp may be stored in the shaft position storage 306 at each angular transition of the shaft 136 detected by the sensor 208 (i.e., at 0°, 90°, 180°, and 270°). Thus, if a first angular value (e.g., 90°) is detected at time A and a successive angular value (e.g., 180°) is stored at time B, and the compass unit 132 generated a direction determination at time C, then the shaft angular position may be interpolated as follows:

$$SAP = \left[\frac{t_C - t_A}{t_B - t_A}\right] \cdot \alpha_i + \alpha_{AP} \qquad (1)$$

where:
SAP is shaft angular position;
$t_A$ is the detection time of the first angular transition;
$t_B$ is the detection time of the next successive transition;
$t_C$ is the time of the compass unit direction determination;
$\alpha_i$ is the shaft rotation angle change at each angular transition; and
$\alpha_{AP}$ is the shaft rotation angle at the first angular transition.

Thus, considering the shaft position sensor 400, where:
$t_A = 0$;
$t_B = 125$;
$t_C = 50$;
$\alpha_i = 90$; and
$\alpha_{AP} = 180$, then the interpolated shaft position is computed as:

$$SAP = \left[\frac{50 - 0}{125 - 0}\right] \cdot 90° + 180° = 216°$$

In block 516, the steering controller 212 determines the orientation of the rotation resistant housing relative to the reference direction. The housing angular offset from north (HNO) in degrees is computed as:

$$HNO = CO + SO + SAP \qquad (2)$$

where:
CO is compass offset (i.e., the angular offset from the reference direction (e.g., north) to the reference location on the compass unit 132;
SO is shaft offset (i.e., the angular offset between the reference location 204 of the compass unit 132 and the reference location 206 of the shaft 136; and
SAP is the shaft angular position (i.e., the rotational position of the shaft relative to the housing derived from the shaft position sensor 208).

If additional shaft position sensors are employed, for example, with the downhole motor 214, then equation (1) may be modified as:

$$HNO = CO + SAP + (FO_1 + AOS_1) + \ldots + (FO_n + AOS_n) \qquad (3)$$

where:
CO is compass offset as described above;
$FO_1$ is the fixed angular offset between the reference location 204 of the compass unit 132 and a reference location of a first device coupled to the compass unit 132 (e.g., the reference location 218 of the downhole motor 214);
$AOS_1$ is the angular offset between components of the first device as measured by a shaft position sensor (e.g., offset between a rotor and stator of the downhole motor 214);
$FO_n$ is the fixed angular offset between the reference location of the $n^{th}$ device and the reference location of the device preceding the $n^{th}$ device (e.g., between the reference location 224 of the shaft of the downhole motor 214 and the reference location 206 of the shaft of the rotary steerable tool 128); and
SAP is the shaft angular position as defined above.

In block 518, the steering controller 212 determines a direction in which the housing is steered. HSD, the housing steering direction, is computed as:

$$HSD = 360 - HNO + KDO \qquad (4)$$

where:
HNO is housing north offset as described above; and
KDO is the kick-off direction (desired tool string direction) relative to the reference direction.

Because the rotation resistant housing 130 does rotate to some extent, the orientation of the housing 130 must be periodically determined. Therefore, some embodiments repeat at least some of the operations described above to periodically determine the orientation of the rotation resistant housing 130. Alternatively, the rotary steerable tool 128 includes a sensor that detects housing rotation. In such a tool, HNO may be computed once, and a corrected housing steering direction ($HSD_C$) computed that accounts for the detected housing rotation.

$$HSD_C = 360 - HNO + KDO - HAP \qquad (5)$$

where:
HAP is the rotational position of the housing 130 relative to the last computed HNO.

Some embodiments may compensate for torque induced twist in the tool string that changes the angular offset between the compass unit 132 and the shaft 136. A look-up table specifying a twist value based on torque can be used to determine the change in angular offset. Alternatively, a formula that computes the twist based on torque can be used, or the twist can be measured.

In block 520, the steering controller 212 causes the actuators to steer the tool string in the kick-off direction.

Figure 6:
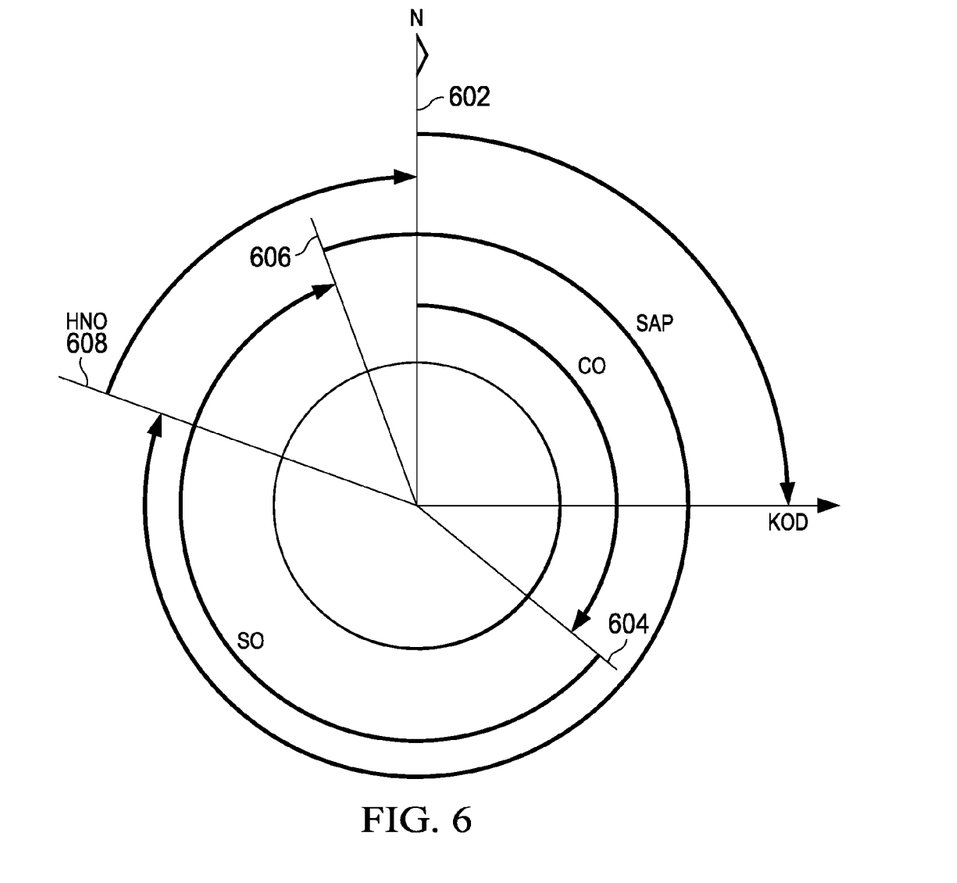
FIG. 6 shows a diagram combining the various angular parameters used to steer a downhole tool in accordance with various embodiment.

FIG. 6 shows a diagram combining the various angular parameters used to steer a tool string in a borehole in accordance with equations (2) and (4) above. In FIG. 6 the reference direction 602 is north. The compass unit 132 determines an azimuth between the reference direction and the reference location 204 of the compass unit 132. In FIG. 6, the azimuth or CO is 130, indicating that the compass unit reference location 204 is 130° clockwise from the reference direction at 604. SO=210, indicating that the reference location 206 of the shaft 136 is approximately 210° clockwise from the compass unit reference location 204 of the compass unit 132 at 606. At the time that CO was determined by the compass unit 132, SAP=310, indicating that the shaft 136 was rotated 310° clockwise in the housing 130 based on the reference location 210 of the housing 130 and the reference location 206 of the shaft 136 at HNO 608. Thus, at the time CO was determined, the housing 130 was rotated 290° clockwise of north. KDO is set to 90° clockwise of north. Consequently, the steering controller 212 will steer the tool string 160° (360−290+90) clockwise of the housing reference position 210.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, often serves as a functional equivalent to resistivity. Accordingly, the scope of protection is not limited to the embodiments described herein, but is only limited by the claims which follow, the scope of which shall include all equivalents of the subject matter of the claims.

What is claimed is:

1. A method for steering a rotary steerable tool in a borehole, comprising:
   determining an azimuthal angle between a reference direction and a reference point on a direction determination component of a tool string;
   communicating the azimuthal angle and a time at which the angle was determined to a rotary steerable tool direction control system; and
   deflecting a steerable shaft of the rotary steerable tool based on the azimuthal angle and the time at which the angle was determined, thereby directing the rotary steerable tool in a predetermined direction;
   wherein the direction determination component is remote from the rotary steerable tool.

2. The method of claim 1, further comprising synchronizing a clock of the direction determination component and a clock of the direction control system.

3. The method of claim 1, further comprising storing periodically determined time-stamped rotary position information for the steerable shaft.

4. The method of claim 1, further comprising:
   identifying stored rotary position information corresponding to the time at which the azimuthal angle was determined; and
   determining the position of a rotation resistant housing surrounding the steerable shaft relative to the reference direction at the time at which the azimuthal angle was determined based on the information.

5. The method of claim 1, further comprising providing the predetermined direction to the rotary steerable tool, wherein the predetermined direction is relative to the reference direction.

6. The method of claim 1, further comprising determining an initial angle between the reference point on the direction determination component and a reference point on the steerable shaft.

7. The method of claim 1, further comprising determining an angular offset of a rotation resistant housing surrounding the steerable shaft relative to the reference direction based on the azimuthal angle, a fixed rotational offset between the direction determination component and the rotary steerable tool, stored rotary position information having a time stamp corresponding to the time at which the azimuthal angle was determined, and a measured rate of steerable shaft rotation.

8. The method of claim 1, further comprising:
   determining an initial angle of a tool string component disposed between the direction determination component and the rotary steerable tool relative to the reference point;
   communicating the azimuthal angle and a time at which the azimuthal angle was determined to the tool string component;
   determining a rotation angle of the tool string component based on the time; and
   communicating the initial angle of the tool string component and the rotational angle of the tool string component to the rotary steerable tool direction control system;
   wherein the directing is further based on the initial angle of the tool string component and the rotation angle of the tool string component.

9. The method of claim 1, wherein the rotary steerable tool is steered as part of drilling the borehole.

10. The method of claim 1, wherein the directing comprises combining the predetermined direction, the azimuthal angle, and a fixed rotational offset between the direction determination component and the rotary steerable tool.

11. A system for steering a rotary steerable tool in a borehole, comprising:
   a rotary steerable tool, comprising:
      a rotation resistant housing; and
      a steerable shaft;
   a steering controller that determines a direction for the steerable shaft; and
   a compass unit that is remote from the rotary steerable tool and comprises:
      a direction reference location;
      a direction determination unit that determines an azimuth from the direction of the reference location relative to a reference direction; and
      a transmitter that communicates the azimuth and a time at which the azimuth is determined to the steering controller, wherein the steering controller determines the direction for the steerable shaft based on the azimuth, the time at which the azimuth is determined, and a recorded steerable shaft rotation position corresponding to the time.

12. The system of claim 11, wherein each of the rotary steerable tool and the compass unit further comprises a clock and logic to synchronize the clocks.

13. The system of claim 11, wherein the rotary steerable tool further comprises a shaft position sensor that determines a rotation position of the steerable shaft relative to the rotation resistant housing.

14. The system of claim 11, wherein the rotary steerable tool further comprises a storage unit that stores a plurality of periodic determinations of steerable shaft rotation position relative the rotation resistant housing.

15. The system of claim 14, wherein the steering controller identifies the determination of steerable shaft rotation position corresponding to the time at which the azimuth is determined and determines the rotary position of the rotation resistant housing relative to the reference direction at the time at which the azimuth is determined.

16. The system of claim 11, wherein the steering controller includes a storage unit that stores an initial angular offset between the steerable shaft and the direction reference location, and determines the direction for the steerable shaft further based on the stored initial angle.

17. The system of claim 11, wherein the rotary steerable tool generates a magnetic field capable of disrupting direction determinations of a magnetic compass within the rotary steerable tool, and the direction determination unit comprises a magnetic compass that is not disrupted by the magnetic field.

18. The system of claim 11, further comprising a downhole tool disposed between the rotary steerable tool and the compass module, the downhole tool comprising:
    a clock and logic that synchronizes the clock to a clock of the compass module;
    a direction sensor that periodically determines a rotation position of the downhole tool;
    a storage unit that stores a plurality of periodic determinations of rotational position of the downhole tool.

19. The system of claim 18, wherein the steering controller determines the direction for the steerable shaft further based on at least one of the determinations of rotational position of the downhole tool corresponding to the time.

20. The system of claim 11, wherein the system is part of a system for drilling the borehole.

21. A rotary steerable tool, comprising:
    a rotation resistant housing;
    a steerable shaft disposed within the housing; and
    a steering controller disposed within the housing;
    wherein the steering controller determines a magnetic tool face of the rotation resistant housing based on a magnetic direction identified by a different downhole tool that is remote from the rotary steerable tool, and deflects the shaft within the housing based on the magnetic tool face to change the direction of the rotary steerable tool.

22. The rotary steerable tool of claim 21, wherein the steering controller receives the magnetic direction as an angular offset between a magnetic tool face of the downhole tool and a reference location of the downhole tool, and a time value at which the magnetic tool face was identified.

23. The rotary steerable tool of claim 21, further comprising a magnetic field generator that generates a magnetic field capable of interfering that with magnetic direction determinations of a magnetometer in the rotary steerable tool.

24. The rotary steerable tool of claim 21, wherein the steering controller periodically measures a rotational position of the shaft relative to a reference location of the rotation resistant housing, and stores a plurality of measured rotational positions of the shaft and an acquisition time for each measured rotational position.

25. The rotary steerable tool of claim 24, wherein the steering controller comprises a clock that provides the acquisition time for each measured rotational position, the clock being synchronized to a clock in the downhole tool.

26. The rotary steerable tool of claim 21, wherein the steering controller stores an angular difference between a reference location on the downhole tool and a reference location on the shaft, and determines the magnetic tool face based on the angular difference and the magnetic direction.

27. The rotary steerable tool of claim 21, wherein the steering controller identifies a rotation resistant housing position relative to the magnetic direction by identifying a stored time value corresponding to the time at which the magnetic direction received by the steering controller was determined;
    wherein the stored time value is associated with an a rotational position of the shaft relative to the housing.

28. The rotary steerable tool of claim 21, wherein the steering controller determines the magnetic tool face based on an interpolation between two shaft angular offset values using times associated with the offset values and, a time value associated with identification of magnetic direction by the downhole tool.

29. The rotary steerable tool of claim 21, wherein the tool is connected as part of a drill string capable of drilling a borehole.

30. A steering control system for a rotary steerable tool, comprising:
    a computer readable medium encoded with instructions that when executed by a processor cause the processor to:
        receive, from a downhole tool, a measurement of angular distance from a reference location of the downhole tool to a reference direction, and a time value at which the measurement was made;
        select a stored measurement of angular distance between a reference location of a rotation resistant housing of the rotary steerable tool and a reference location of a steerable shaft of the rotary steerable tool based on the time value; and
        determine a magnetic tool face of the rotation resistant housing based on the measurement of angular distance received from the first downhole tool and the selected measurement of angular distance.

31. The steering control system of claim 30, wherein the computer readable is further encoded with instructions that when executed by a processor cause the processor to deflect the steerable shaft based on the determined magnetic tool face of the housing.

* * * * *